(12) United States Patent
Cross, Jr. et al.

(10) Patent No.: US 8,145,493 B2
(45) Date of Patent: Mar. 27, 2012

(54) ESTABLISHING A PREFERRED MODE OF INTERACTION BETWEEN A USER AND A MULTIMODAL APPLICATION

(75) Inventors: Charles W. Cross, Jr., Wellington, FL (US); Hilary A. Pike, College Station, TX (US)

(73) Assignee: Nuance Communications, Inc., Burlington, MA (US)

( * ) Notice: Subject to any disclaimer, the term of this patent is extended or adjusted under 35 U.S.C. 154(b) by 1016 days.

(21) Appl. No.: 11/530,599

(22) Filed: Sep. 11, 2006

(65) Prior Publication Data
US 2008/0065386 A1    Mar. 13, 2008

(51) Int. Cl.
*G10L 21/00* (2006.01)
(52) U.S. Cl. .................. 704/270; 704/3; 704/9; 704/257
(58) Field of Classification Search ............. 379/210.01, 379/88.04; 715/746, 205; 370/466; 704/270.1, 704/257, 270, 1–10, 251–255; 709/220
See application file for complete search history.

(56) References Cited

U.S. PATENT DOCUMENTS

| | | | |
|---|---|---|---|
| 5,577,165 A | 11/1996 | Takebayashi et al. | |
| 5,584,052 A | 12/1996 | Gulau et al. | |
| 5,969,717 A | 10/1999 | Ikemoto | |
| 6,208,972 B1 | 3/2001 | Grant et al. | |
| 6,243,375 B1 | 6/2001 | Speicher | |
| 6,275,806 B1 | 8/2001 | Pertrushin | |
| 6,301,560 B1 | 10/2001 | Masters | |
| 6,513,011 B1 | 1/2003 | Uwakubo | |
| 6,606,599 B2 | 8/2003 | Grant et al. | |
| 6,856,960 B1 | 2/2005 | Dragosh et al. | |
| 6,920,425 B1 | 7/2005 | Will et al. | |
| 6,999,930 B1 | 2/2006 | Roberts et al. | |
| 7,035,805 B1 | 4/2006 | Miller | |
| 7,136,909 B2 * | 11/2006 | Balasuriya | 709/220 |
| 7,150,399 B2 | 12/2006 | Barrus et al. | |
| 7,171,243 B2 | 1/2007 | Watanabe et al. | |
| 7,188,067 B2 | 3/2007 | Grant et al. | |
| 7,210,098 B2 * | 4/2007 | Sibal et al. | 715/205 |
| 7,233,655 B2 * | 6/2007 | Gailey et al. | 379/210.01 |

(Continued)

FOREIGN PATENT DOCUMENTS

CN    1385783    12/2002

(Continued)

OTHER PUBLICATIONS

Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

(Continued)

*Primary Examiner* — Huyen X. Vo
(74) *Attorney, Agent, or Firm* — Wolf, Greenfield & Sacks, P.C.

(57) ABSTRACT

Establishing a preferred mode of interaction between a user and a multimodal application, including evaluating, by a multimodal application operating on a multimodal device supporting multiple modes of interaction including a voice mode and one or more non-voice modes, user modal preference, and dynamically configuring multimodal content of the multimodal application in dependence upon the evaluation of user modal preference.

21 Claims, 7 Drawing Sheets

U.S. PATENT DOCUMENTS

| | | | |
|---|---|---|---|
| 7,242,752 B2 * | 7/2007 | Chiu | 379/88.04 |
| 7,330,890 B1 | 2/2008 | Partovi et al. | |
| 7,333,507 B2 * | 2/2008 | Bravin et al. | 370/466 |
| 7,376,586 B1 | 5/2008 | Partovi et al. | |
| 7,487,453 B2 * | 2/2009 | Goebel et al. | 715/746 |
| 7,487,085 B2 | 3/2009 | Cross | |
| 2002/0065944 A1 | 5/2002 | Hickey et al. | |
| 2002/0092019 A1 | 7/2002 | Marcus | |
| 2002/0099553 A1 | 7/2002 | Brittan et al. | |
| 2002/0120554 A1 | 8/2002 | Vega | |
| 2002/0147593 A1 | 10/2002 | Lewis et al. | |
| 2002/0184610 A1 | 12/2002 | Chong et al. | |
| 2003/0039341 A1 | 2/2003 | Burg et al. | |
| 2003/0046316 A1 | 3/2003 | Gergic et al. | |
| 2003/0046346 A1 | 3/2003 | Mumick et al. | |
| 2003/0101451 A1 | 5/2003 | Bentolila et al. | |
| 2003/0125945 A1 | 7/2003 | Doyle | |
| 2003/0179865 A1 | 9/2003 | Stillman et al. | |
| 2003/0182622 A1 | 9/2003 | Sibal et al. | |
| 2003/0195739 A1 | 10/2003 | Washio | |
| 2003/0217161 A1 | 11/2003 | Balasuriya | |
| 2003/0229900 A1 | 12/2003 | Reisman | |
| 2003/0235282 A1 | 12/2003 | Sichelman et al. | |
| 2004/0019487 A1 | 1/2004 | Kleindienst et al. | |
| 2004/0025115 A1 | 2/2004 | Sienel et al. | |
| 2004/0031058 A1 | 2/2004 | Reisman | |
| 2004/0044516 A1 | 3/2004 | Kennewick et al. | |
| 2004/0049390 A1 | 3/2004 | Brittan et al. | |
| 2004/0059705 A1 | 3/2004 | Wittke et al. | |
| 2004/0083109 A1 | 4/2004 | Halonen et al. | |
| 2004/0120472 A1 | 6/2004 | Popay et al. | |
| 2004/0120476 A1 | 6/2004 | Harrison et al. | |
| 2004/0138890 A1 | 7/2004 | Ferrans et al. | |
| 2004/0153323 A1 | 8/2004 | Charney et al. | |
| 2004/0179038 A1 | 9/2004 | Blattner et al. | |
| 2004/0216036 A1 | 10/2004 | Chu et al. | |
| 2004/0236574 A1 | 11/2004 | Ativanichayaphong | |
| 2004/0260562 A1 | 12/2004 | Kijirai | |
| 2005/0075884 A1 | 4/2005 | Badt, Jr. | |
| 2005/0091059 A1 | 4/2005 | Lecoeuche | |
| 2005/0131701 A1 | 6/2005 | Cross | |
| 2005/0138219 A1 | 6/2005 | Boughannam | |
| 2005/0138647 A1 | 6/2005 | Boughannam | |
| 2005/0154580 A1 | 7/2005 | Horowitz et al. | |
| 2005/0160461 A1 | 7/2005 | Baumgartner et al. | |
| 2005/0188412 A1 | 8/2005 | Dacosta | |
| 2005/0203729 A1 | 9/2005 | Roth et al. | |
| 2005/0203747 A1 | 9/2005 | Lecoeuche | |
| 2005/0261908 A1 | 11/2005 | Cross | |
| 2005/0273769 A1 | 12/2005 | Eichenberger et al. | |
| 2005/0283367 A1 | 12/2005 | Cross | |
| 2006/0047510 A1 | 3/2006 | Cross | |
| 2006/0064302 A1 | 3/2006 | Cross | |
| 2006/0069564 A1 | 3/2006 | Allison et al. | |
| 2006/0074680 A1 | 4/2006 | Cross | |
| 2006/0075120 A1 | 4/2006 | Smit | |
| 2006/0111906 A1 | 5/2006 | Cross | |
| 2006/0122836 A1 | 6/2006 | Cross | |
| 2006/0123358 A1 | 6/2006 | Lee et al. | |
| 2006/0136222 A1 | 6/2006 | Cross | |
| 2006/0146728 A1 | 7/2006 | Engelsma et al. | |
| 2006/0168095 A1 | 7/2006 | Sharma et al. | |
| 2006/0168595 A1 | 7/2006 | McArdle | |
| 2006/0184626 A1 | 8/2006 | Agapi | |
| 2006/0190264 A1 | 8/2006 | Jaramillo | |
| 2006/0218039 A1 | 9/2006 | Johnson | |
| 2006/0229880 A1 | 10/2006 | White | |
| 2006/0235694 A1 | 10/2006 | Cross | |
| 2006/0287845 A1 | 12/2006 | Cross et al. | |
| 2006/0287865 A1 | 12/2006 | Cross et al. | |
| 2006/0287866 A1 | 12/2006 | Cross et al. | |
| 2006/0288309 A1 | 12/2006 | Cross et al. | |
| 2007/0265851 A1 | 11/2007 | Cross et al. | |
| 2007/0274296 A1 | 11/2007 | Cross et al. | |
| 2007/0274297 A1 | 11/2007 | Cross et al. | |
| 2007/0288241 A1 | 12/2007 | Cross et al. | |
| 2007/0294084 A1 | 12/2007 | Cross | |
| 2008/0065386 A1 | 3/2008 | Cross et al. | |
| 2008/0065387 A1 | 3/2008 | Cross et al. | |
| 2008/0065388 A1 | 3/2008 | Cross et al. | |
| 2008/0065389 A1 | 3/2008 | Cross et al. | |
| 2008/0065390 A1 | 3/2008 | Ativanichayaphong et al. | |
| 2008/0086564 A1 | 4/2008 | Putman et al. | |
| 2008/0140410 A1 | 6/2008 | Cross et al. | |
| 2008/0162136 A1 | 7/2008 | Ativanichayaphong et al. | |
| 2008/0177530 A1 | 7/2008 | Cross et al. | |
| 2008/0195393 A1 | 8/2008 | Cross et al. | |
| 2008/0208584 A1 | 8/2008 | Cross et al. | |
| 2008/0208585 A1 | 8/2008 | Ativanichayaphong et al. | |
| 2008/0208586 A1 | 8/2008 | Ativanichayaphong et al. | |
| 2008/0208587 A1 | 8/2008 | Cross et al. | |
| 2008/0208588 A1 | 8/2008 | Cross et al. | |
| 2008/0208589 A1 | 8/2008 | Cross et al. | |
| 2008/0208590 A1 | 8/2008 | Cross et al. | |
| 2008/0208591 A1 | 8/2008 | Ativanichayaphong et al. | |
| 2008/0208592 A1 | 8/2008 | Cross et al. | |
| 2008/0208593 A1 | 8/2008 | Ativanichayaphong et al. | |
| 2008/0208594 A1 | 8/2008 | Cross et al. | |
| 2008/0228494 A1 | 9/2008 | Cross et al. | |
| 2008/0228495 A1 | 9/2008 | Cross et al. | |
| 2008/0235021 A1 | 9/2008 | Cross et al. | |
| 2008/0235022 A1 | 9/2008 | Cross et al. | |
| 2008/0235027 A1 | 9/2008 | Cross | |
| 2008/0235029 A1 | 9/2008 | Cross et al. | |
| 2008/0249782 A1 | 10/2008 | Ativanichayaphong et al. | |
| 2008/0255850 A1 | 10/2008 | Cross et al. | |
| 2008/0255851 A1 | 10/2008 | Cross et al. | |

FOREIGN PATENT DOCUMENTS

| | | |
|---|---|---|
| CN | 1385783 A | 12/2002 |
| CN | 1564123 A | 1/2005 |
| EP | 0794670 A | 9/1997 |
| EP | 1450350 | 8/2004 |
| EP | 0507148.5 | 4/2005 |
| JP | 2000155529 A | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. PCT/EP2008/051358.

PCT Search Report, Jun. 18, 2008; PCT Application No. PCT/EP2008/051363.

Didier Guillevic, et al., Robust Semantic Confidence Scoring ICSLP 2002: 7th International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

U.S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.

* cited by examiner

ESTABLISHING A PREFERRED MODE OF INTERACTION BETWEEN A USER AND A MULTIMODAL APPLICATION

BACKGROUND OF THE INVENTION

1. Field of the Invention

The field of the invention is data processing, or, more specifically, methods, apparatus, and products for establishing a preferred mode of interaction between a user and a multimodal application.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications often run on servers that serve up multimodal web pages for display on a multimodal browser. A 'multimodal browser,' as the term is used in this specification, generally means a web browser capable of receiving multimodal input and interacting with users with multimodal output. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Current lightweight voice solutions require a developer to build a grammar and lexicon to limit the potential number of words that an automated speech recognition ('ASR') engine must recognize—as a means for increasing accuracy. Pervasive devices have limited interaction and input modalities due to the form factor of the device, and kiosk devices have limited interaction and input modalities by design. In both cases the use of speaker independent voice recognition is implemented to enhance the user experience and interaction with the device. The state of the art in speaker independent recognition allows for some sophisticated voice applications to be written as long as there is a limited vocabulary associated with each potential voice command. For example, if the user is prompted to speak the name of a city the system can, with a good level of confidence, recognize the name of the city spoken.

Incorporating speech into web application makes the multimodal and leads users to expect a multimodal application to dynamically adjust to establish the user's preferred mode of interaction. In addition, establishing the preferred method of communication would allow the multimodal application to optimize the use of visual space, audio space, and network traffic between multimodal devices and servers. The application developer is now faced with the responsibility of determining the user's preferred mode of communication for a multimodal application to provide the most value add for the application and satisfy the end-user. In the current art, however, there are no means of establishing a preferred mode of interaction between a user and a multimodal application, although it would be better if there were.

SUMMARY OF THE INVENTION

Methods, apparatus, and computer program products are described for establishing a preferred mode of interaction between a user and a multimodal application that include evaluating, by a multimodal application operating on a multimodal device supporting multiple modes of interaction including a voice mode and one or more non-voice modes, user modal preference, and dynamically configuring multimodal content of the multimodal application in dependence upon the evaluation of user modal preference.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
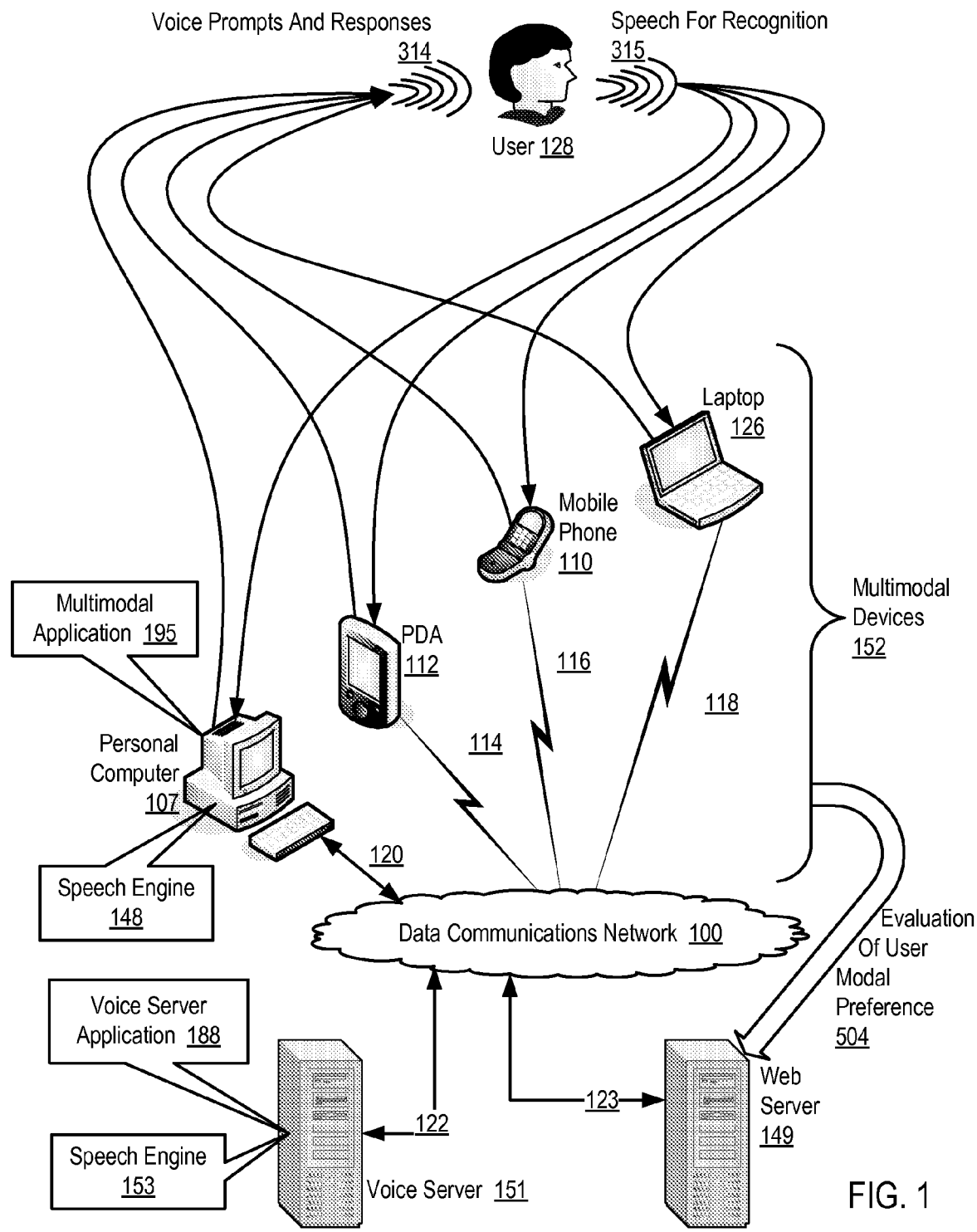
FIG. 1 sets forth a network diagram illustrating an exemplary system for establishing a preferred mode of interaction between a user and a multimodal application according to embodiments of the present invention.

FIG. 1—Network-Oriented System Diagram

Exemplary methods, apparatus, and products for establishing a preferred mode of interaction between a user and a multimodal application according to embodiments of the present invention are described with reference to the accompanying drawings, beginning with FIG. 1. FIG. 1 sets forth a network diagram illustrating an exemplary system for establishing a preferred mode of interaction between a user and a multimodal application according to embodiments of the present invention. The system of FIG. 1 operates generally to establish a preferred mode of interaction between a user and a multimodal application according to embodiments of the present application by evaluating, by a multimodal application operating on a multimodal device supporting multiple modes of interaction including a voice mode and one or more non-voice modes, user modal preference and dynamically configuring multimodal content of the multimodal application in dependence upon the evaluation of user modal preference.

A multimodal device is an automated device, that is, automated computing machinery or a computer program running on an automated device, that is capable of accepting from users more than one mode of input, keyboard, mouse, stylus, and so on, including speech input—and also displaying more than one mode of output, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, this specification uses the term 'multimodal application' to refer to any software application, server-oriented or client-oriented, thin client or thick client, that administers more than one mode of input and more than one mode of output, typically including visual and speech modes.

The system of FIG. 1 includes several example multimodal devices:

personal computer (107) which is coupled for data communications to data communications network (100) through wireline connection (120), personal digital assistant ('PDA') (112) which is coupled for data communications to data communications network (100) through wireless connection (114), mobile telephone (110) which is coupled for data communications to data communications network (100) through wireless connection (116), and laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled RTP Payload Format for European Telecommunications Standards Institute (ETSI) European Standard ES 201 108 Distributed Speech Recognition Encoding and the Internet Draft entitled RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for establishing a preferred mode of interaction between a user and a multimodal application according to embodiments of the present invention may be encoded with any codec, including, for example:

AMR (Adaptive Multi-Rate Speech coder)

ARDOR (Adaptive Rate-Distortion Optimized sound codeR),

Dolby Digital (A/52, AC3),

DTS (DTS Coherent Acoustics),

MP1 (MPEG audio layer-1),

MP2 (MPEG audio layer-2) Layer 2 audio codec (MPEG-1, MPEG-2 and non-ISO MPEG-2.5), MP3 (MPEG audio layer-3) Layer 3 audio codec (MPEG-1, MPEG-2 and non-ISO MPEG-2.5), Perceptual Audio Coding,

FS-1015 (LPC-10),

FS-1016 (CELP),

G.726 (ADPCM),

G.728 (LD-CELP),

G.729 (CS-ACELP),
GSM,
HILN (MPEG-4 Parametric audio coding), and
others as may occur to those of skill in the art.

As mentioned, a multimodal device according to embodiments of the present invention is capable of providing speech to a speech engine for recognition. A speech engine is a functional module, typically a software module, although it may include specialized hardware also, that does the work of recognizing and generating or 'synthesizing' human speech. The speech engine implements speech recognition by use of a further module referred to in this specification as a ASR engine, and the speech engine carries out speech synthesis by use of a further module referred to in this specification as a text-to-speech ('TTS') engine. As shown in FIG. 1, a speech engine (148) may be installed locally in the multimodal device (107) itself, or a speech engine (150) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal application software that obtains speech recognition and speech synthesis services from a voice server located remotely across a network from the thin client.

Each of the example multimodal devices (152) in the system of FIG. 1 may be configured to establish a preferred mode of interaction between a user and a multimodal application according to embodiments of the present invention by evaluating user modal preference. Such evaluation is carried out in this example by a multimodal application operating on the multimodal device and supporting multiple modes of interaction including a voice mode and one or more non-voice modes. Example of non-voice modes of interaction include keystrokes on a keyboard and mouse button clicks and mouse movements of a mouse. A multimodal application may support multiple modes of interaction in that data entry fields in the multimodal application may be variously enabled for voice and non-voice modes of interaction. A portion of the data entry fields may be voice-enabled, for example, while some of the data entry fields may not be voice-enabled, accepting user interactions only in the form of mouseclicks or keystrokes.

The process of establishing a preferred mode of interaction between a user and a multimodal application can include identifying a mode of interaction used by a user for an interaction with the multimodal application, where evaluating user modal preference also includes evaluating user modal preference in dependence upon the identity of the mode, whether the mode is, for example, a voice mode or a non-voice mode, keystrokes, mouseclicks, and so on. Alternatively, evaluating user modal preference may be carried out by use of a user-supplied configuration value of user modal preference, typed into data storage through an administrative or maintenance screen or dialog box. For ease of illustration, only the personal computer (107) in the system of FIG. 1 is illustrated with a multimodal application (195), but all multimodal devices (152) may contain multimodal applications.

The use of these four example multimodal devices (152) is for explanation only, not for limitation of the invention. Any automated computing machinery capable of accepting speech from a user, providing the speech digitized to an ASR engine, and receiving and playing speech prompts and responses from the voice server may be improved to function as a multimodal device for establishing a preferred mode of interaction between a user and a multimodal application according to embodiments of the present invention.

The system of FIG. 1 also includes a voice server (151) which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152) and the voice server (151) for data communications. A data communications network for establishing a preferred mode of interaction between a user and a multimodal application according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet™ Protocol or the Wireless Ethernet™ Protocol, a data communications network layer with the Internet Protocol ('IP'), a transport layer with the Transmission Control Protocol ('TCP') or the User Datagram Protocol ('UDP'), an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and other protocols as will occur to those of skill in the art.

The system of FIG. 1 includes a web server (149) connected for data communications through wireline connection (123) to network (100) and therefore to the multimodal devices (152). The web server (149) may be any server that provides to client devices markup documents that compose multimodal applications. The web server (149) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. The markup documents also may be implemented in any markup language that supports non-speech display elements, data entry elements, and speech elements for identifying which speech to recognize and which words to speak, grammars, form elements, and the like, including, for example, X+V and SALT. A multimodal application in a multimodal device then, upon receiving from the web sever (149) a markup document as part of a multimodal application, may execute speech elements by use of a speech engine (148) in the multimodal device itself or by use of a speech engine (153) located remotely from the multimodal device in a voice server (151).

The web server (149) in this example is programmed to establish a preferred mode of interaction between a user (128) and a multimodal application (195) according to embodiments of the present application by dynamically configuring multimodal content of a multimodal application in dependence upon the evaluation of user modal preference. The evaluation of user modal preference (504), evaluated on a multimodal device (152), is provided by the multimodal device to the web server (149) by data communications means across network (100). The web server (149) functions generally by receiving from multimodal devices (152) requests in a request/response data communications protocol such as HTTP and responding to the requests by providing to the requesting multimodal device through data communications means multimodal application markup documents, sometimes referred to as 'web pages.' A set of such markup documents organized in a sequence of presentation makes up a multimodal application. The web server may dynamically configure the multimodal content of a multimodal application by altering the sequence of presentation. Grammars in a markup document representing a first web page in a multimodal application may, for example, voice-enabled data entry fields, some of which are prompted for keyboard entry on the first web page and others on a second web page. If a user speaks words that are recognized as data entry for all the data entry fields during display of the first web page, the web server, having all the data needed to fill the fields on the second page, can skip the second page in its presentation of the multimodal application and proceed to the next page in the presentation sequence.

The set of markup documents that comprise a multimodal application (195) may be made up of static markup documents, where each of the markup documents includes varying proportions of support for voice mode and non-voice modes. The set may include three static markup documents, for example, each of which represents the same web page in a sequence of presentation, one of which has one third of its data entry fields voice-enabled, the second with two thirds of its data entry fields voice-enabled, and the third with all of its data entry fields voice-enabled. Then the web server (149) may dynamically configure multimodal content of the multimodal application by selecting among the static markup documents, in dependence upon the value of the user modal preference (504), a markup document for presentation to a user as part of the multimodal application. If, for example, the evaluation of user modal preference is represented by a coefficient having a range of values between 0.0 and 1.0 with higher values representing a higher preference for voice mode, then the web server may select the second static page described above when presented with an evaluation of user modal preference of 0.5.

A multimodal application (195) may specify a dynamic server page capable of generating static markup documents of the multimodal application that include varying proportions of support for voice mode and non-voice modes. The web server (149) then may dynamically configure multimodal content of the multimodal application by generating by the dynamic server page a static markup document for presentation to a user (128) as part of the multimodal application (195), where the static markup document is characterized by proportions of support for voice and non-voice modes established by the dynamic server page in dependence upon the value of the user modal preference. Again in an example where the evaluation of user modal preference is represented by a coefficient having a range of values between 0.0 and 1.0 with higher values representing a higher preference for voice mode, then the dynamic server page may be programmed to generate a static markup document, a static web page, with half of its data entry fields voice-enabled when presented with an evaluation of user modal preference of 0.5.

The arrangement of the multimodal devices (152), the web server (149), the voice server (151), and the data communications network (100) making up the exemplary system illustrated in FIG. 1 are for explanation, not for limitation. Data processing systems useful for establishing a preferred mode of interaction between a user and a multimodal application according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Figure 2:
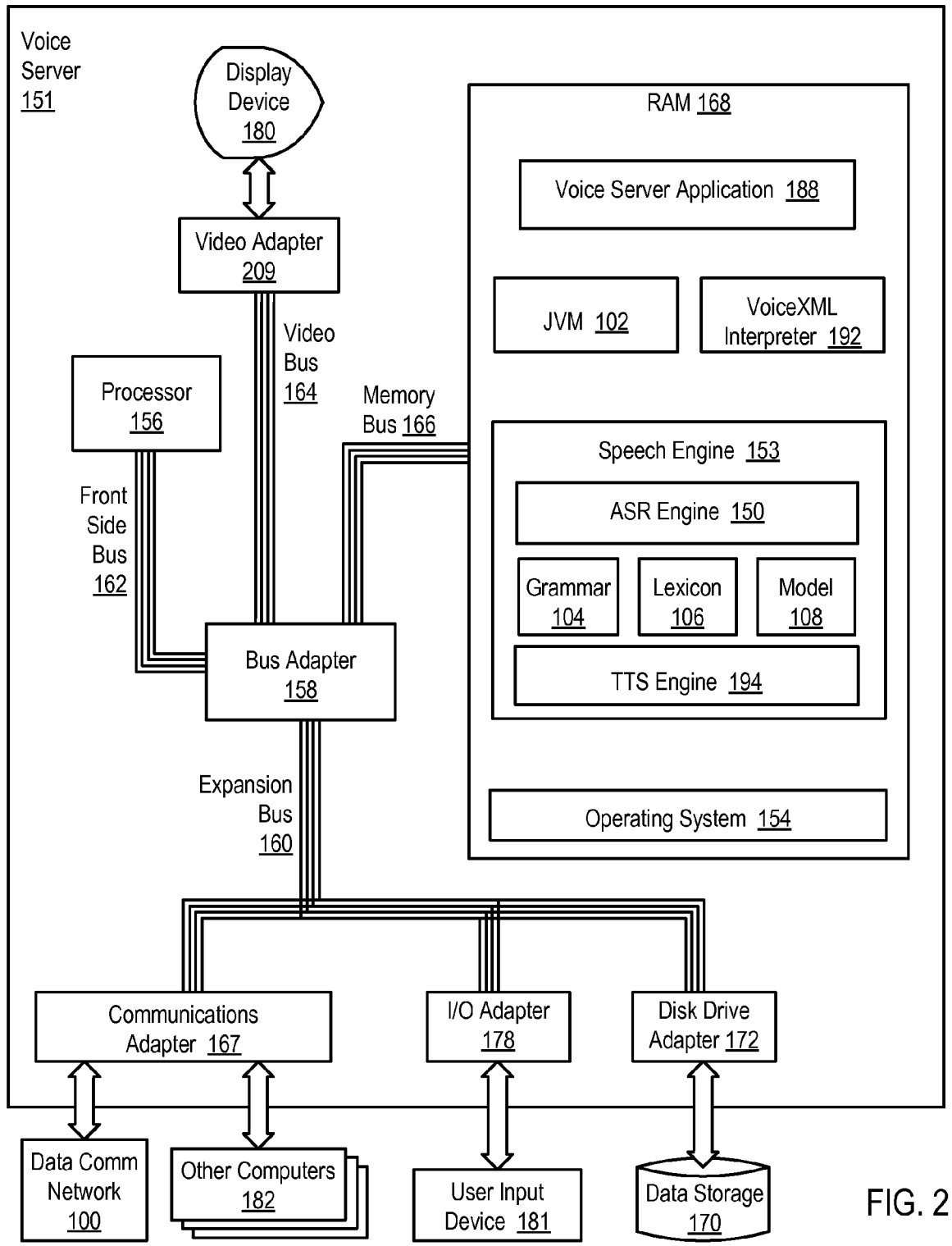
FIG. 2 sets forth a block diagram of automated computing machinery comprising an example of a computer useful as a voice server in establishing a preferred mode of interaction between a user and a multimodal application according to embodiments of the present invention.

FIG. 2—Voice Server/Thin Client Architecture

Establishing a preferred mode of interaction between a user and a multimodal application according to embodiments of the present invention in a thin client architecture typically is implemented with one or more voice servers, computers, that is, automated computing machinery, that provide speech recognition and speech synthesis. For further explanation, therefore, FIG. 2 sets forth a block diagram of automated computing machinery comprising an example of a computer useful as a voice server (151) in establishing a preferred mode of interaction between a user and a multimodal application according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a voice server application (188), a module of computer program instructions capable of operating a voice server in a system that is configured to establish a preferred mode of interaction between a user and a multimodal application according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT applications, or Java Speech applications.

Voice server application (188) may be implemented as a web server, implemented in Java, C++, or another language, that supports X+V, SALT, VoiceXML, or another multimodal language, by providing responses to HTTP requests from X+V, SALT, or other multimodal clients. Voice server application (188) may, for a further example, be implemented as a Java server that runs on a Java Virtual Machine (102) and supports a Java voice framework by providing responses to HTTP requests from Java client applications running on multimodal devices. And voice server applications that support establishing a preferred mode of interaction between a user and a multimodal application may be implemented in other ways as may occur to those of skill in the art, and all such ways are well within the scope of the present invention.

The voice server in this example includes a speech engine (153). The speech engine is a functional module, typically a software module, although it may include specialized hardware also, that does the work of recognizing and generating human speech. The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates SFVs with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine.

The grammar (104) communicates to the ASR engine (150) the words and sequences of words that currently may be recognized. For precise understanding, distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same.

Grammars for use in establishing a preferred mode of interaction between a user and a multimodal application according to embodiments of the present invention may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> = [remind me to] call | phone | telephone
    <name> <when>;
    <name> = bob | martha | joe | pete | chris | john | artoush;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises an ASR engine which words presently can be recognized. In this example, expansion includes conjunction and disjunction, and the vertical bars '|' mean 'or.' An ASR engine processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when> rule accepts 'today' or 'this afternoon' or 'tomorrow' or 'next week.' The command grammar as a whole accepts utterances like these, for example:

"phone bob next week,"
"telephone martha this afternoon,"
"remind me to call chris tomorrow," and
"remind me to phone pete today."

The voice server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate from VoiceXML clients running remotely on multimodal devices, from X+V clients running remotely on multimodal devices, or from Java client applications running remotely on multimedia devices. In this example, VoiceXML interpreter (192) interprets and executes VoiceXML segments received from remote multimedia clients and provided to VoiceXML interpreter (192) through voice server application (188). Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 2 are shown in RAM (168), but many components of such software typically are stored in non-volatile memory also, for example, on a disk drive (170).

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for establishing a preferred mode of interaction between a user and a multimodal application according to embodiments of the present invention include modems for wired dial-up communications, Ethernet (IEEE 802.3) adapters for wired data communications network communications, and 802.11 adapters for wireless data communications network communications.

Figure 3:
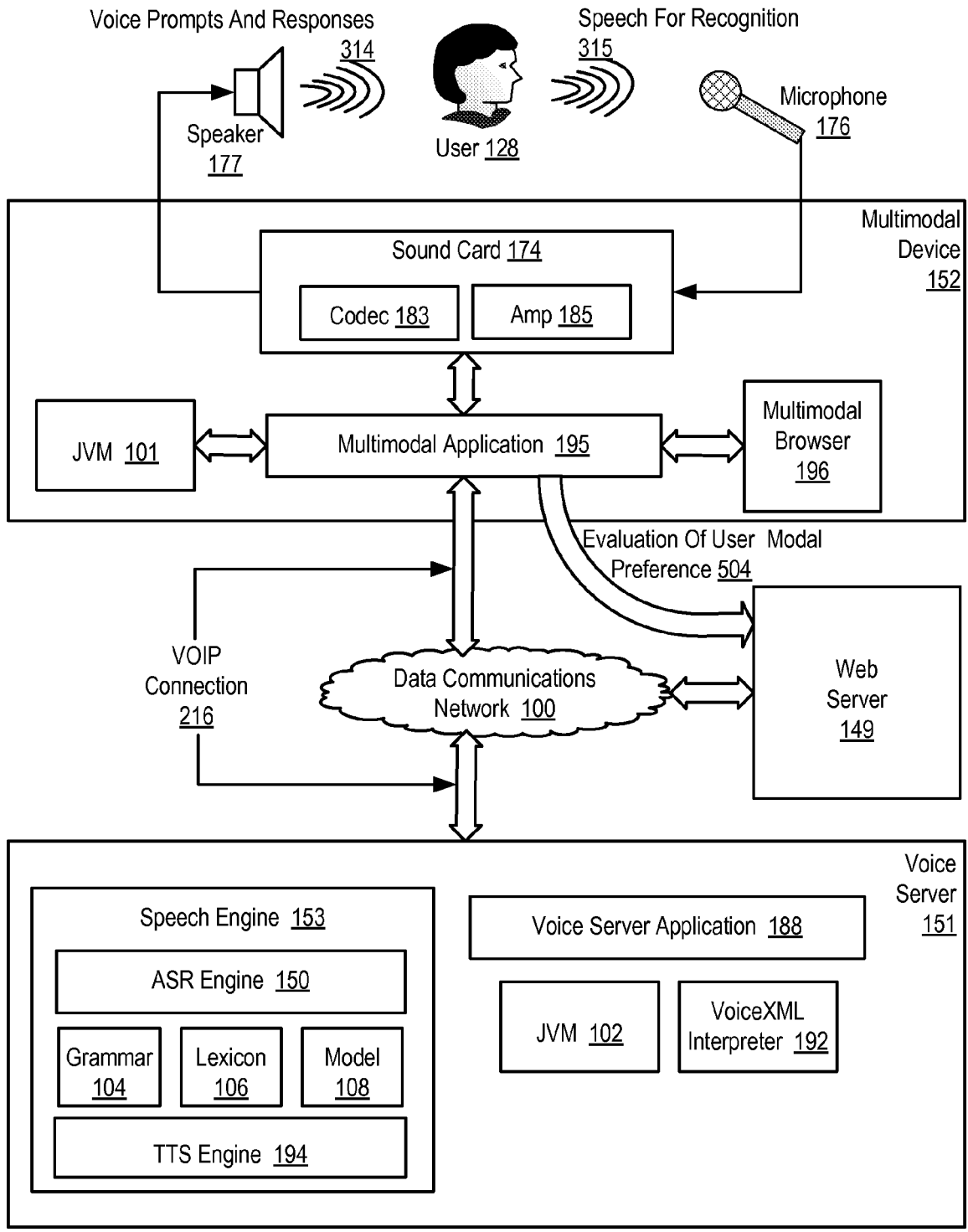
FIG. 3 sets forth a functional block diagram of exemplary apparatus for establishing a preferred mode of interaction between a user and a multimodal application according to embodiments of the present invention.

FIG. 3—Thin Client Architecture

For further explanation, FIG. 3 sets forth a functional block diagram of exemplary apparatus for establishing a preferred mode of interaction between a user and a multimodal application in a thin client architecture according to embodiments of the present invention. The example of FIG. 3 includes a multimodal device (152) and a voice server (151) connected for data communication by a VOIP connection (216) through a data communications network (100). A multimodal application (195) runs on the multimodal device (152), and a voice server application (188) runs on the voice server (151). The multimodal client application (195) may be a set or sequence of X+V or SALT documents that execute on multimodal browser (196), a Java voice application that executes on the Java Virtual Machine (101), or a multimodal application implemented in other technologies as may occur to those of skill in the art. The example multimodal device of FIG. 3 also includes a sound card (174), which is an example of an I/O adapter specially designed for accepting analog audio signals from a microphone (176) and converting the audio analog signals to digital form for further processing by a codec (183).

In addition to the multimodal sever application (188), the voice server (151) also has installed upon it a speech engine (153) with an ASR engine (150), a grammar (104), a lexicon (106), a language-specific acoustic model (108), and a TTS engine (194), as well as a JVM (102), and a Voice XML interpreter (192). VoiceXML interpreter (192) interprets and executes VoiceXML grammars received from the multimodal application and provided to VoiceXML interpreter (192) through voice server application (188). VoiceXML input to VoiceXML interpreter (192) may originate from the multimodal application (195) implemented as an X+V client running remotely on the multimodal device (152). As noted above, the multimedia device application (195) also may be implemented as a Java client application running remotely on the multimedia device (152), a SALT application running remotely on the multimedia device (152), and in other ways as may occur to those of skill in the art.

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operates in a manner that is similar to the operation of the system of FIG. 2 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal application (195) then packages the digitized speech in a recognition request message according to a VOIP protocol, and transmits the speech to voice server (151) through the VOIP connection (216) on the network (100).

Voice server application (188) provides voice recognition services for multimodal devices by accepting requests for speech recognition and returning speech recognition results, including text representing recognized speech, text for use as variable values in dialogs, and output from execution of semantic interpretation scripts. Voice server application (188) includes computer program instructions that provide text-to-speech ('TTS') conversion for voice prompts and voice responses to user input in multimodal applications such as, for example, X+V applications, SALT applications, or Java Speech applications.

The voice server application (188) receives speech for recognition from a user and passes the speech through API calls to an ASR engine (150) for recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech founds as words in the lexicon to words in a grammar to determine whether words or phrases in speech are recognized by the ASR engine.

The system of FIG. 3 operates generally to establish a preferred mode of interaction between a user and a multimodal application according to embodiments of the present application by evaluating, by a multimodal application operating on a multimodal device supporting multiple modes of interaction including a voice mode and one or more non-voice modes, user modal preference and dynamically configuring multimodal content of the multimodal application in dependence upon the evaluation of user modal preference. The multimodal device (152) in the system of FIG. 3 is configured to establish a preferred mode of interaction between a user and a multimodal application according to embodiments of the present invention by evaluating user modal preference. Such evaluation is carried out in this example by a multimodal application (195) operating on the multimodal device and supporting multiple modes of interaction including a voice mode and one or more non-voice modes. Example of non-voice modes of interaction include keystrokes on a keyboard and mouse button clicks and mouse movements of a mouse. A multimodal application may support multiple modes of interaction in that data entry fields in the multimodal application may be variously enabled for voice and non-voice modes of interaction. A portion of the data entry fields may be voice-enabled, for example, while some of the data entry fields may not be voice-enabled, accepting user interactions only in the form of mouseclicks or keystrokes.

The process of establishing a preferred mode of interaction between a user and a multimodal application can include identifying a mode of interaction used by a user for an interaction with the multimodal application, where evaluating user modal preference also includes evaluating user modal preference in dependence upon the identity of the mode, whether the mode is, for example, a voice mode or a non-voice mode, keystrokes, mouseclicks, and so on. Alternatively, evaluating user modal preference may be carried out by use of a user-supplied configuration value of user modal preference, typed into data storage through an administrative or maintenance screen or dialog box.

The web server (149) in this example is programmed to establish a preferred mode of interaction between a user (128) and a multimodal application (195) according to embodiments of the present application by dynamically configuring multimodal content of a multimodal application in dependence upon the evaluation of user modal preference. The evaluation of user modal preference (504), evaluated on a multimodal device (152), is provided by the multimodal device to the web server (149) by data communications means across network (100). The web server (149) functions generally by receiving from multimodal devices (152) requests in a request/response data communications protocol such as HTTP and responding to the requests by providing to the requesting multimodal device through data communications means multimodal application markup documents, sometimes referred to as 'web pages.' A set of such markup documents organized in a sequence of presentation makes up a multimodal application. The web server may dynamically configure the multimodal content of a multimodal application by altering the sequence of presentation. Grammars in a markup document representing a first web page in a multimodal application may, for example, voice-enabled data entry fields, some of which are prompted for keyboard entry on the first web page and others on a second web page. If a user speaks words that are recognized as data entry for all the data entry fields during display of the first web page, the web server, having all the data needed to fill the fields on the second page, can skip the second page in its presentation of the multimodal application and proceed to the next page in the presentation sequence.

The set of markup documents that comprise a multimodal application (195) may be made up of static markup documents, where each of the markup documents includes varying proportions of support for voice mode and non-voice modes. The set may include three static markup documents, for example, each of which represents the same web page in a sequence of presentation, one of which has one third of its data entry fields voice-enabled, the second with two thirds of its data entry fields voice-enabled, and the third with all of its data entry fields voice-enabled. Then the web server (149) may dynamically configure multimodal content of the multimodal application by selecting among the static markup documents, in dependence upon the value of the user modal preference (504), a markup document for presentation to a user as part of the multimodal application. If, for example, the evaluation of user modal preference is represented by a coefficient having a range of values between 0.0 and 1.0 with higher values representing a higher preference for voice mode, then the web server may select the second static page described above when presented with an evaluation of user modal preference of 0.5.

A multimodal application (195) may specify a dynamic server page capable of generating static markup documents of the multimodal application that include varying proportions of support for voice mode and non-voice modes. The web server (149) then may dynamically configure multimodal content of the multimodal application by generating by the dynamic server page a static markup document for presentation to a user (128) as part of the multimodal application (195), where the static markup document is characterized by proportions of support for voice and non-voice modes established by the dynamic server page in dependence upon the value of the user modal preference. Again in an example where the evaluation of user modal preference is represented by a coefficient having a range of values between 0.0 and 1.0 with higher values representing a higher preference for voice mode, then the dynamic server page may be programmed to generate a static markup document, a static web page, with half of its data entry fields voice-enabled when presented with an evaluation of user modal preference of 0.5.

Figure 4:
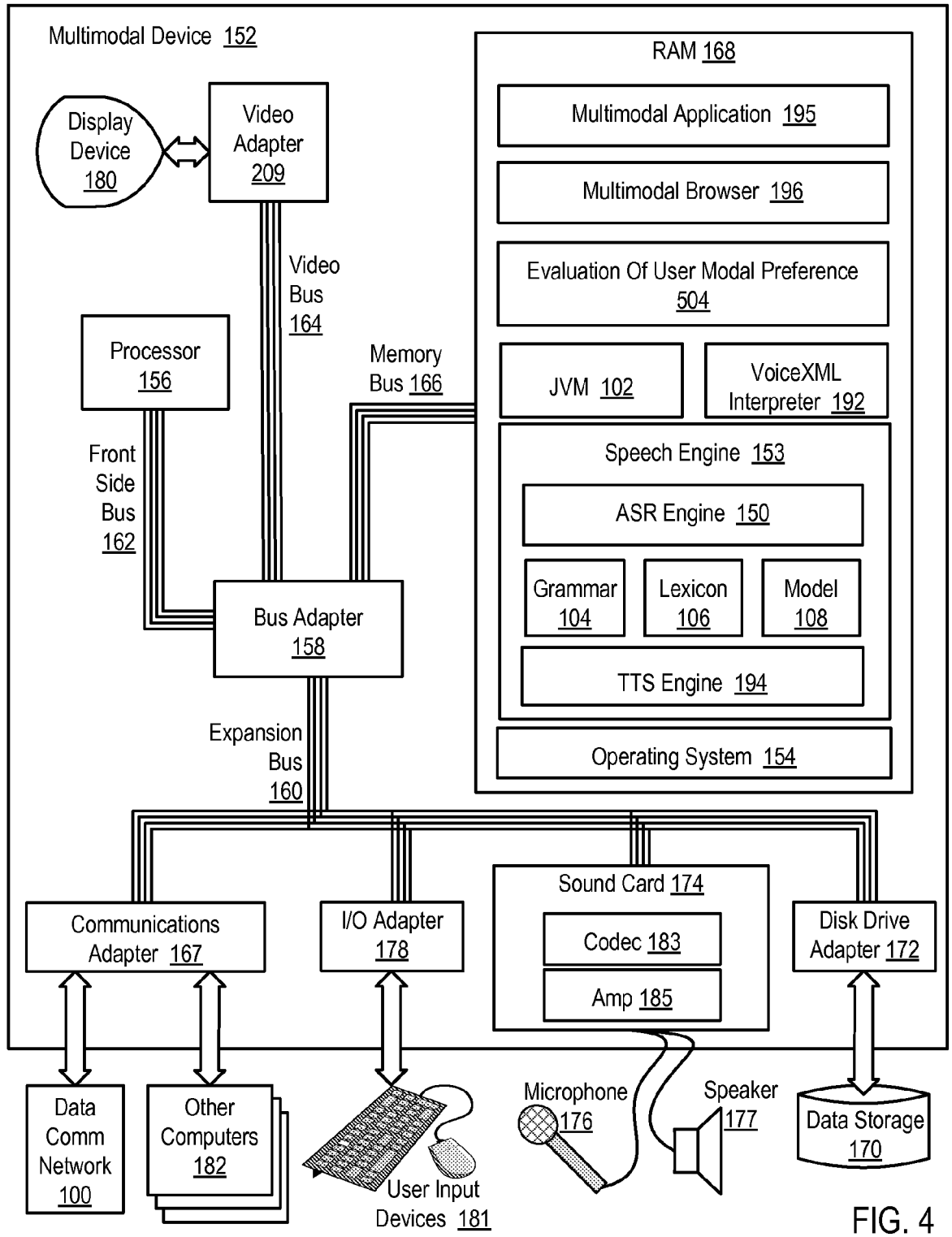
FIG. 4 sets forth a block diagram of automated computing machinery comprising an example of a computer useful as a multimodal device in establishing a preferred mode of interaction between a user and a multimodal application according to embodiments of the present invention.

FIG. 4—Thick Client

Establishing a preferred mode of interaction between a user and a multimodal application according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) in establishing a preferred mode of interaction between a user and a multimodal application according to embodiments of the present invention. In apparatus implementing thick multimodal clients as illustrated in FIG. 4, there is a multimodal device (152) with no connection to a voice server containing a remote speech engine. All the components needed for speech synthesis and voice recognition in establishing a preferred mode of interaction between a user and a multimodal application according to embodiments of the present invention are installed or embedded in the multimodal device itself.

The example multimodal device (152) of FIG. 4 includes several components that are structured and operate similarly as do parallel components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a JVM (102), a VoiceXML Interpreter (192), and so on, including a speech engine (153). As in the system of FIG. 4, the speech engine in the multimodal device of FIG. 2 includes an ASR engine (150), a grammar (104), a lexicon (106), a language-dependent acoustic model (108), and a TTS engine (194). The speech engine (153) in this kind of embodiment often is implemented as an embedded module in a small form factor device such as a handheld device, a mobile phone, PDA, and the like. An example of an embedded speech engine useful for establishing a preferred mode of interaction between a user and a multimodal application according to embodiments of the present invention is IBM's Embedded ViaVoice Enterprise. The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal application (195), a module of computer program instructions capable of operating a multimodal device as an apparatus that supports establishing a preferred mode of interaction between a user and a multimodal application according to embodiments of the present invention. The multimodal application (195) implements speech recognition by accepting speech for recognition from a user and sending the speech for recognition through API calls to the ASR engine (150). The multimodal application (195) implements speech synthesis generally by sending words to be used as prompts for a user to the TTS engine (194). As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal application (195) may be implemented as a set or sequence of X+V documents executing in a multimodal browser (196) or microbrowser that passes VoiceXML grammars and digitized speech through API calls directly to an embedded VoiceXML interpreter (192) for processing. The embedded VoiceXML interpreter (192) may in turn issue requests for speech recognition through API calls directly to the embedded ASR engine (150). Multimodal application (195) also can provide speech synthesis, TTS conversion, by API calls to the embedded TTS engine (194) for voice prompts and voice responses to user input.

In a further class of exemplary embodiments, the multimodal application (195) may be implemented as a Java voice application that executes on Java Virtual Machine (102) and calls the ASR engine (150) and the TTS engine (194) directly through APIs for speech recognition and speech synthesis services. In further exemplary embodiments, the multimodal application (195) may be implemented as a set or sequence of SALT documents executed on a multimodal browser (196) or microbrowser that calls the ASR engine (150) and the TTS engine (194) through APIs for speech recognition and speech synthesis services. In addition to X+V, SALT, and Java implementations, multimodal application (195) may be implemented in other technologies as will occur to those of skill in the art, and all such implementations are well within the scope of the present invention.

The multimodal device (152) in this example is configured to establish a preferred mode of interaction between a user and a multimodal application according to embodiments of the present invention by evaluating user modal preference. Such evaluation is carried out in this example by the multimodal application (195) operating on the multimodal device and supporting multiple modes of interaction including a voice mode and one or more non-voice modes. Example of non-voice modes of interaction include keystrokes on a keyboard and mouse button clicks and mouse movements of a mouse. A multimodal application may support multiple modes of interaction in that data entry fields in the multimodal application may be variously enabled for voice and non-voice modes of interaction. A portion of the data entry fields may be voice-enabled, for example, while some of the data entry fields may not be voice-enabled, accepting user interactions only in the form of mouseclicks or keystrokes.

The process of establishing a preferred mode of interaction between a user and a multimodal application can include identifying a mode of interaction used by a user for an interaction with the multimodal application, where evaluating user modal preference also includes evaluating user modal preference in dependence upon the identity of the mode, whether the mode is, for example, a voice mode or a non-voice mode, keystrokes, mouseclicks, and so on. Alternatively, evaluating user modal preference may be carried out by use of a user-supplied configuration value of user modal preference, typed into data storage through an administrative or maintenance screen or dialog box.

The multimodal application (195) in this example, running on a multimodal device (152) that contains its own speech engine (153) with no connection to a voice server containing a remote speech engine or a remote voice server application, is an example of a so-called 'thick client,' so-called because all of the functionality for processing voice mode interactions between a user and the multimodal application is implemented on the multimodal device itself.

FIG. 5—Web Server

Establishing a preferred mode of interaction between a user and a multimodal application according to embodiments of the present invention in thick client architectures is generally implemented with at least one web server. A web server is a computer that accepts requests for web pages communicated in data communications protocols such as HTTP over networks from multimodal devices and returns web pages in response to the requests. For further explanation, therefore, FIG. 5 sets forth a block diagram of automated computing machinery comprising an example of a computer useful as a web server (149) in establishing a preferred mode of interaction between a user and a multimodal application according to embodiments of the present invention.

Figure 5:
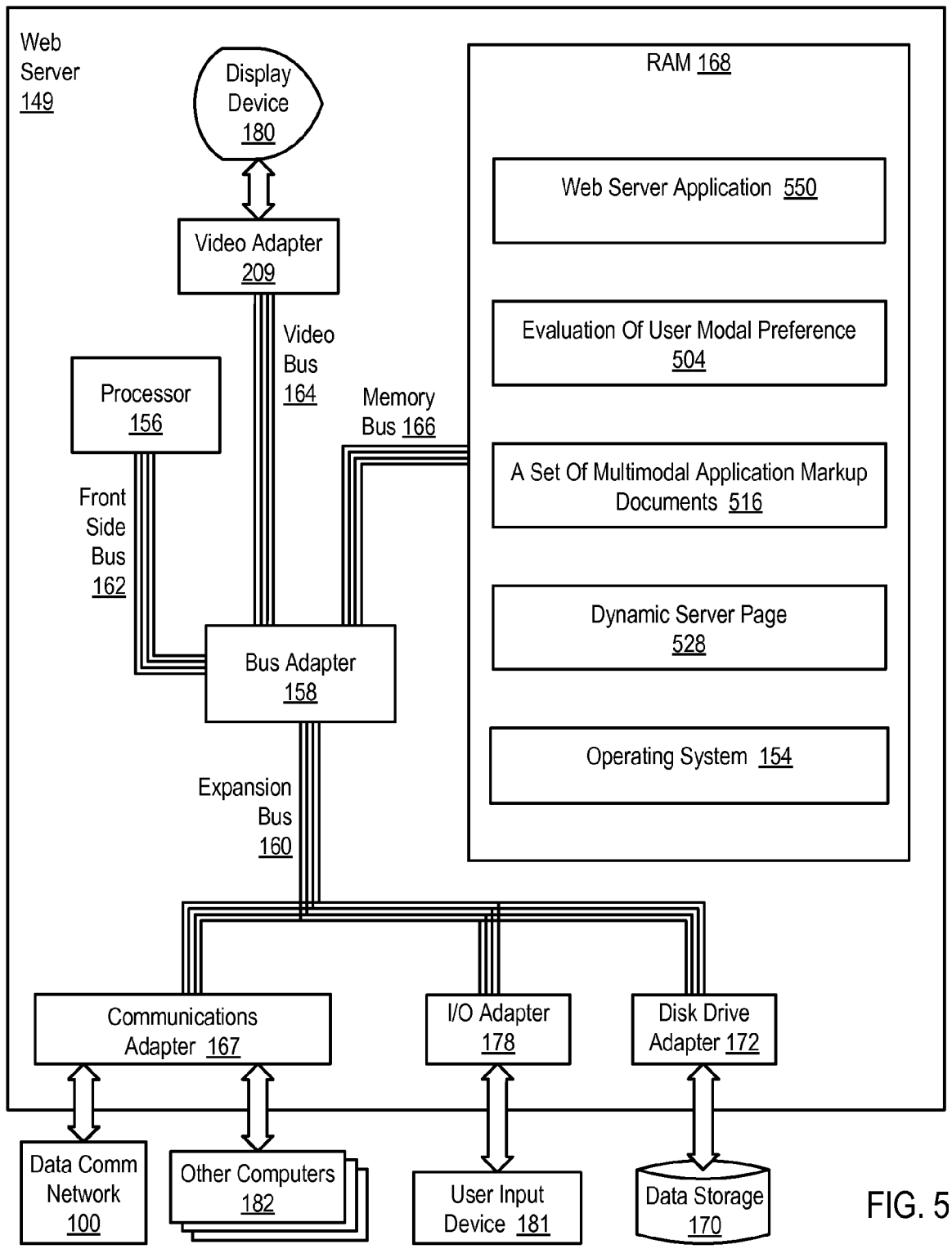
FIG. 5 sets forth a block diagram of automated computing machinery comprising an example of a computer useful as a web server in establishing a preferred mode of interaction between a user and a multimodal application according to embodiments of the present invention.

The example web server (149) of FIG. 5 includes several components that are structured and operate similarly as do parallel components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), and an operating system (154).

Also stored in RAM (168) in this example is a web server application (168), a module of computer program instructions capable of operating a web server as an apparatus that supports establishing a preferred mode of interaction between a user and a multimodal application according to embodiments of the present invention. Also stored in RAM is an evaluation of user modal preference (504) provided to the web server by a multimodal device. Also stored in RAM is a set of multimodal application markup documents (516) for use in dynamically configuring multimodal content of a multimodal application in dependence upon the evaluation of the user modal preference (504). Also stored in RAM is a dynamic server page (528) for use in dynamically configuring multimodal content of a multimodal application in dependence upon the evaluation of the user modal preference (504).

Web server application (168) in this example is a user-level, server-side computer program, implemented in Java, C, C++, or another programming language that may occur to someone of skill in the art, that operates to establish a preferred mode of interaction between a user and a multimodal application according to embodiments of the present invention by dynamically configuring multimodal content of a multimodal application in dependence upon an evaluation of user modal preference. The evaluation of user modal preference (504), evaluated on a multimodal device (152), is provided by the multimodal device to the web server (149) by data communications means across a data communications network. The web server application (550) receives from multimodal devices requests in a request/response data communications protocol such as HTTP and responds to the requests by providing to the requesting multimodal device through data communications means multimodal application markup documents, sometimes referred to as 'web pages.' A set (516) of such markup documents organized in a sequence of presentation makes up a multimodal application. The web server application (550) may dynamically configure the multimodal content of a multimodal application by altering the sequence of presentation. Grammars in a markup document representing a first web page in a multimodal application may, for example, voice-enabled data entry fields, some of which are prompted for keyboard entry on the first web page and others on a second web page. If a user speaks words that are recognized as data entry for all the data entry fields during display of the first web page, the web server application (550), having all the data needed to fill the fields on the second page, can skip the second page in its presentation of the multimodal application and proceed to the next page in the presentation sequence.

The set (516) of markup documents that comprise a multimodal application (195) may be made up of static markup documents, where each of the markup documents includes varying proportions of support for voice mode and non-voice modes. The set may include three static markup documents, for example, each of which represents the same web page in a sequence of presentation, one of which has one third of its data entry fields voice-enabled, the second with two thirds of its data entry fields voice-enabled, and the third with all of its data entry fields voice-enabled. Then the web server application (550) may dynamically configure multimodal content of the multimodal application by selecting among the static markup documents, in dependence upon the value of the user modal preference (504), a markup document for presentation to a user as part of the multimodal application. If, for example, the evaluation of user modal preference is represented by a coefficient having a range of values between 0.0 and 1.0 with higher values representing a higher preference for voice mode, then the web server application (550) may select the second static page described above when presented with an evaluation of user modal preference of 0.5.

A multimodal application (195) may specify a dynamic server page (528) capable of generating static markup documents of the multimodal application that include varying proportions of support for voice mode and non-voice modes. The web server application (550) then may dynamically configure multimodal content of the multimodal application by generating by the dynamic server page (528) a static markup document for presentation to a user as part of the multimodal application, where the static markup document is characterized by proportions of support for voice and non-voice modes established by the dynamic server page in dependence upon the value of the user modal preference. Again in an example where the evaluation of user modal preference is represented by a coefficient having a range of values between 0.0 and 1.0 with higher values representing a higher preference for voice mode, then the dynamic server page (528) may be programmed to generate a static markup document, a static web page, with half of its data entry fields voice-enabled when presented with an evaluation of user modal preference of 0.5.

Figure 6:
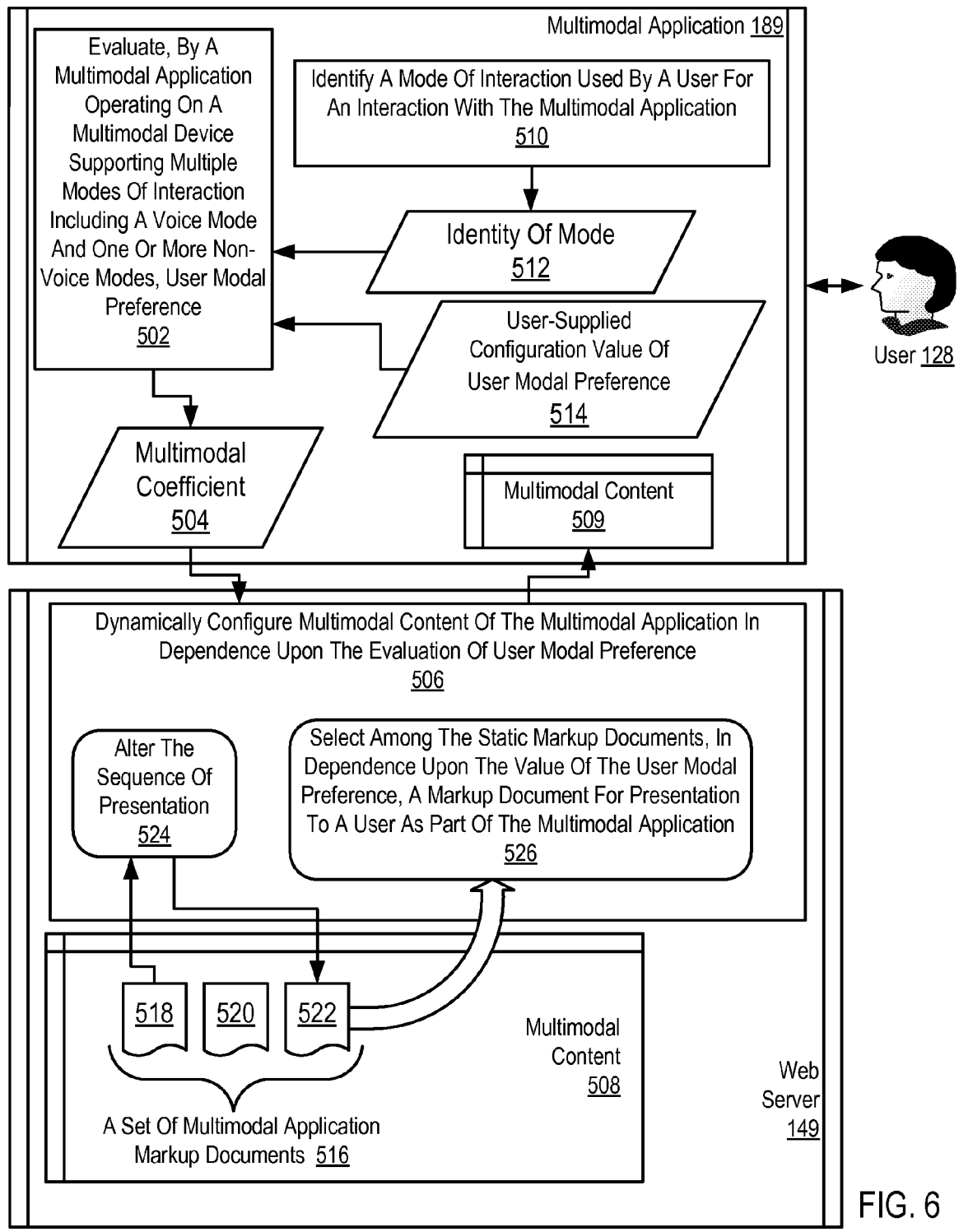
FIG. 6 sets forth a flow chart illustrating an exemplary method of establishing a preferred mode of interaction between a user and a multimodal application according to embodiments of the present invention.

FIG. 6—First Flowchart

For further explanation, FIG. 6 sets forth a flow chart illustrating an exemplary method of establishing a preferred mode of interaction between a user (128) and a multimodal application (189) according to embodiments of the present invention. The method of FIG. 6 includes identifying (510) a mode of interaction used by a user (128) for an interaction with the multimodal application (189). A mode of interaction may, for example, be identified as a voice mode of interaction if the user inputs data into a data input element by voice. Or a mode of interaction may be identified as a non-voice mode of interaction if the user inputs data into a data input element by keystroke or mouseclicks.

The method of FIG. 6 includes evaluating (502), by a multimodal application operating on a multimodal device supporting multiple modes of interaction including a voice mode and one or more non-voice modes, user modal preference. In the method of FIG. 6, evaluating (502) user modal preference may be carried out by evaluating user modal preference in dependence upon a user-supplied configuration value (514) of user modal preference. Also in the method of FIG. 6, evaluating user modal preference may be carried out by evaluating user modal preference in dependence upon the identity of a mode of interaction. In the example of FIG. 6, an evaluation of user modal preference is represented by a modal coefficient (504) having, for example, a value weighted according to preferred mode of interaction, higher values representing a preference for voice mode, lower values representing a preference for one or more non-voice modes. The following markup document is an example of evaluating user modal preference in dependence upon the identity of a mode of interaction, that is, upon whether an identified mode actually used by the user is a voice mode or a non-voice mode.

```
Example markup document, "Modality":
<html xmlns="http://www.w3.org/1999/xhtml"
    xmlns:vxml="http://www.w3.org/2001/vxml"
    xmlns:ev="http://www.w3.org/2001/xml-events"
    xmlns:xv="http://www.voicexml.org/2002/xhtml+voice">
<head>
    <title>Modality</title>
    <script language="JavaScript" type="text/javascript">
        modalCoef = 0.5
        function calculateModalCoefficient( ) {
            if(document.fid.in1.value != ""){
                if(document.fid.mode1.value=="voice"){
                    modalCoef = modalCoef − 0.1; }
                else { modalCoef = modalCoef + 0.1; }
            } // end if
            if(document.fid.in2.value != ""){
                if(document.fid.mode2.value=="voice"){
                    modalCoef = modalCoef − 0.1; }
                else { modalCoef = modalCoef + 0.1; }
            } // end it
            document.fid.coef.value = modalCoef;
        } // end function
    </script>
    <vxml:form id="stateform">
        <vxml:field name="state">
            <vxml:prompt>
                Which state do you live in? <vxml:value expr="state"/>?
            </vxml:prompt>
            <vxml:grammar src="state.grxml" type="application/srgs+xml"/>
            <vxml:filled>
                <vxml:assign name="document.fid.in1.value" expr="state"/>
                <vxml:assign name="document.fid.mode1.value"
                    expr="voice"/>
                <vxml:throw event="voice"/>
            </vxml:filled>
        </vxml:field>
    </vxml:form>
    <vxml:form id="cityform">
        <vxml:field name="city">
            <vxml:prompt>
                Which city do you live in? <vxml:value expr="city"/>?
            </vxml:prompt>
            <vxml:grammar src="" type="application/srgs+xml"/>
            <vxml:filled>
                <vxml:assign name="document.fid.in2.value" expr="city"/>
                <vxml:assign name="document.fid.mode2.value"
                    expr="voice"/>
            </vxml:filled>
        </vxml:field>
    </vxml:form>
</head>
<body>
    <h2 id="p1" class="server">Which state do you live in?</h2>
    <form name=
    "fid" action="http://www.webBrowser.com/modality.jsp">
        <table> <tbody> <tr>
            <td>State:</td>
            <td>
                <input type="text" name="in1" ev:event="focus"
                    ev:handler="stateform" value=""/>
                <input type="hidden" name="mode1"/> </td>
            <td>City:</td>
            <td>
                <input type="text" name="in2" ev:event="focus"
                    ev:handler="cityform" value=""/>
                <input type="hidden" name="mode2"/> </td>
            <td>
                <input type="submit" name="in3" ev:event="onClick"
                    ev:handler=
                    "JavaScript:calculateModalCoefficient( )"/>
                <input type="hidden" name="coef"/>
            </td> </tr> </tbody> </table>
```

-continued

```
    </form>
</body>
</html>
```

This example markup document is an X+V page entitled "Modality" and referred to hereafter as 'the Modality example.' The Modality example includes a JavaScript function named calculateModalCoefficient for evaluating user modal preference. The Modality example also includes an HTML data input form named "fid" that in turn includes two HTML data input fields for text, named respectively "in1" and "in2." "In1" is an input field for a component of a user address, the state where the user lives. Similarly, "in2" is an input field for the user's city of residence. "In1" and "in2" are voice-enabled respectively by VoiceXML forms named "stateform" and "cityform." "In1" names "stateform" as its event handler for its focus event:

```
<input type="text" name="in1" ev:event="focus"
    ev:handler="stateform" value=""/>
```

And "in2" names "cityform" as its event handler for its focus event:

```
<input type="text" name="in2" ev:event="focus"
    ev:handler="cityform" value=""/>
```

The "fid" form also establishes two hidden variable for use in evaluating user modal preference named respectively "mode1" and "mode2," each represented in a DOM (Document Object Model) as document.fid.mode1 and document.fid.mode2 respectively.

VoiceXML form "stateform" includes a data input field named "state." The "stateform" form uses a grammar named "state.grxml" which contains a list of names of state that can be matched by a voice recognition engine. When "state" is filled by voice input, "stateform" loads the DOM variable for the HTML input field "in1," document.fid.in1.value, with the filled value of the VoiceXML input field "state." "Stateform" then loads a DOM (Document Object Model) variable named "document.fid.mode1.value" with the value "voice":

```
<vxml:filled>
    <vxml:assign name="document.fid.in1.value" expr="state"/>
    <vxml:assign name="document.fid.mode1.value" expr="voice"/>
    <vxml:throw event="voice"/>
</vxml:filled>
```

If "in1" is filled by keyboard input, the value of document.fid.mode1.value remainds null.

Similarly, when the data input field "city" is filled in "cityform" by voice input, "cityform" loads the DOM for "in2," document.fid.in2.value, with the filled value of "city" and then loads a DOM variable named "document.fid.mode2.value" with the value "voice":

```
<vxml:filled>
    <vxml:assign name="document.fid.in2.value" expr="city"/>
    <vxml:assign name="document.fid.mode2.value" expr="voice"/>
</vxml:filled>
```

If "in2" is filled by keyboard input, the value of document.fid.mode2.value remainds null.

The form "fid" includes an <input> element of "submit" type that generates a GUI submit button for the "fid" form. The submit button is not voice enabled in this example.

The submit button identifies for its click event an event handler named calculateModalCoefficient:

```
<input type="submit" name="in3" ev:event="onClick"
ev:handler="JavaScript:calculateModalCoefficient( )"/>
```

When the submit button is mouseclicked, therefore, the multimodal application calls the JavaScript named calculateModalCoefficient to evaluate the user modal preference. JavaScript calculateModalCoefficient evaluates user modal preference as a modal coefficient named "modalCoef" with a value incremented and decremented in units of 0.1 from an initial value of 0.5. When calculateModalCoefficient is called, if in1 is filled and mode1 is set to "voice," calculateModalCoefficient increments the modal coefficient. If mode1 is still null, then calculateModalCoefficient decrements the modal coefficient. Similarly, if in2 is filled and mode2 is set to "voice," calculateModalCoefficient increments the modal coefficient. If mode2 is still null when calculateModalCoefficient is called, then calculateModalCoefficient decrements the modal coefficient. CalculateModalCoefficient stores the value of the modal coefficient as an evaluation of user modal preference in a DOM field named document.fid.coef.value, declared as a hidden field by the HTML form "fid" by:

```
<input type="hidden" name="coef"/>
```

When the submit button is mouseclicked, after the call to calculateModalCoefficient, the multimodal application submits the data value contents of the "fid" form to a web browser. In particular in this example, the multimodal application submits the form data to a web browser specified in the "action" attribute of form "fid" as "www.webBrowser.com" and within www.webBrowser.com to a dynamic server page named "modality.jsp." The "jsp" suffix of modality.jsp identifies modality.jsp as a Java Server Page. Any form of dynamic server page is workable, however, including for example Active Server Pages ('ASPs') and PHP Hypertext Preprocessor ('PHP') dynamic server pages.

In this way, the Modality example provides an evaluation of user modal preference as a measure of the portion of available voice enabled fields that are accessed by voice by a user. In this example, for ease of explanation, only two data input fields were voice-enabled. Readers of skill in the art will appreciate that many web pages have many data input fields, so that a process for evaluating user modal preference like the Modality example may provide a very precise measure of user modal preference. Readers of skill in the art will also recognize that, although the JavaScript calculateModalCoefficient used as algorithm that increments and decrements a coefficient in units of 0.1, the use of any measure of user modal preference is well within the scope of the present invention, including statistical moments, running averages, and so on, as will occur to those of skill in the art.

The method of FIG. 6 also includes dynamically configuring (506) multimodal content of the multimodal application in dependence upon the evaluation of user modal preference. In the method of FIG. 6, the multimodal application may include a set (516) of multimodal application markup documents organized in a sequence of presentation (518, 520, 522). When a multimodal application includes such a set of multimodal application markup documents, dynamically configuring (506) multimodal content of the multimodal application may be carried out by altering (524) the sequence of presentation. For example, grammars in a markup document representing a first web page (518) in a multimodal application may, for example, voice-enabled data entry fields, some of which are prompted for keyboard entry on the first web page and others on a second web page (520). If a user speaks words during display of the first web page that are recognized as data entry for all the data entry fields on both web pages, the web server (149), having all the data needed to fill the fields on the second page, can skip the second page (520) in its presentation of the multimodal application and proceed to the next page (522) in the presentation sequence.

In the method of FIG. 6, the multimodal application may include static markup documents (518, 520, 522), the markup documents including varying proportions of support for voice mode and non-voice modes. When a multimodal application includes static markup documents including varying proportions of support for voice mode and non-voice modes, dynamically configuring (506) multimodal content of the multimodal application may be carried out by selecting (526) among the static markup documents, in dependence upon the value of the user modal preference, a markup document for presentation to a user as part of the multimodal application. Consider for further explanation an example in which the three static markup documents (518, 520, 522) represent three versions of the same web page, each having different proportions of support for voice mode and non-voice modes. Document (518) may have three out of ten input fields voice-enabled, for example, which document (520) has seven out of ten input fields voice-enabled, and document (522) has all ten input fields voice enabled.

Then the web server (149) may dynamically configure multimodal content of the multimodal application by selecting among the static markup documents, in dependence upon the value of the user modal preference (504), a markup document for presentation to a user as part of the multimodal application. If, for example, the evaluation of user modal preference is represented by a coefficient having a range of values between 0.0 and 1.0 with higher values representing a higher preference for voice mode, then the web server (149) may select document (520) when presented with an evaluation of user modal preference, a multimodal coefficient (504), of 0.5. Similarly, the web server (149) may select document (518) when presented with an evaluation of user modal preference, a multimodal coefficient (504), of 0.2- and may select document (522) if the coefficient has a value of 0.8.

Figure 7:
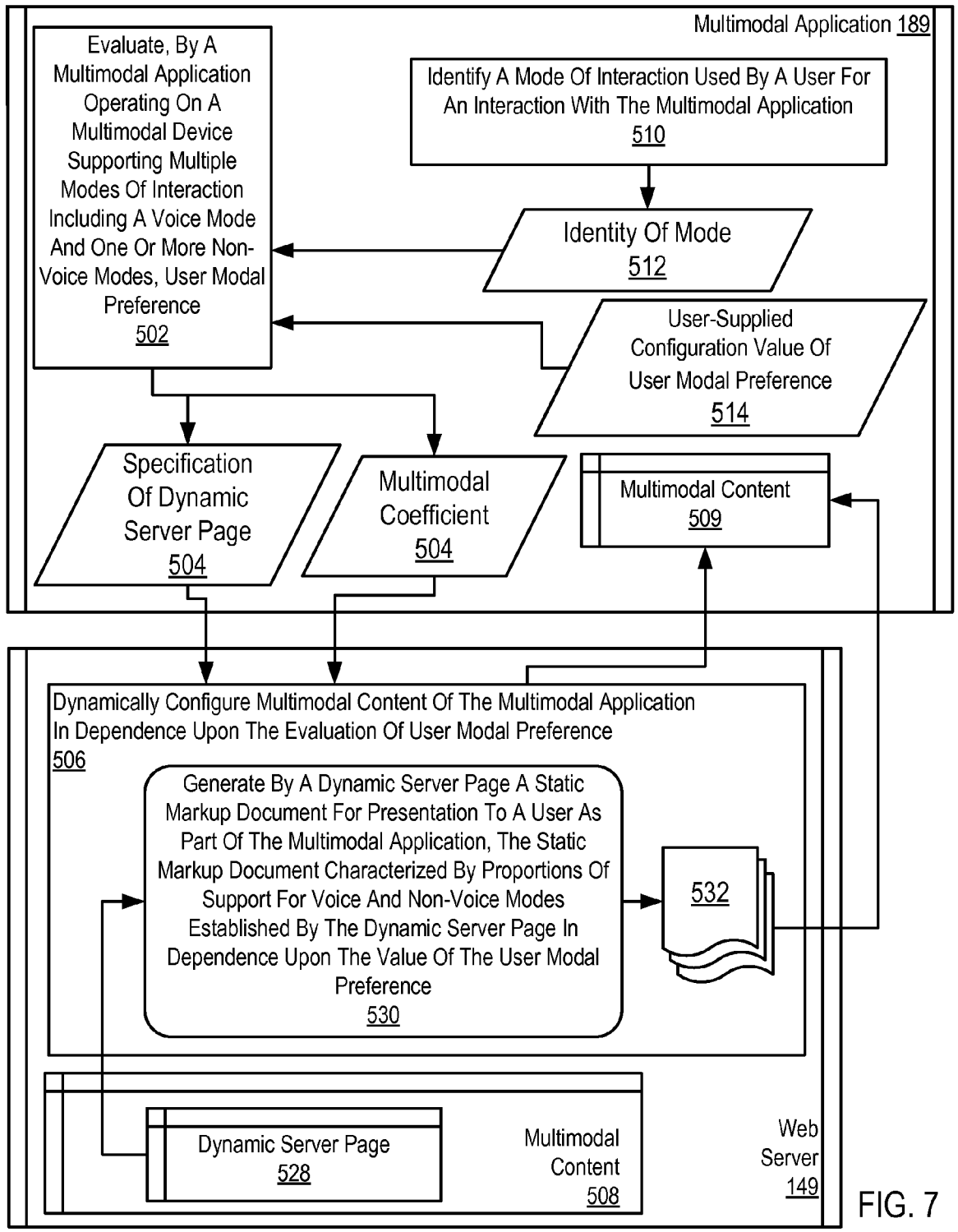
FIG. 7 sets forth a flow chart illustrating a further exemplary method of establishing a preferred mode of interaction between a user and a multimodal application according to embodiments of the present invention.

FIG. 7—Second Flowchart

For further explanation, FIG. 7 sets forth a flow chart illustrating a further exemplary method of establishing a preferred mode of interaction between a user (128) and a multimodal application (189) according to embodiments of the present invention. The method of FIG. 7 includes identifying (510) a mode of interaction used by a user (128) for an interaction with the multimodal application (189) and evaluating (502) user modal preference by use of a multimodal coefficient (504), both of which operate in a manner similar to the operation of the method of FIG. 6 described above. In the method of FIG. 7, however, the multimodal application (189) specifies to the web server (149) a dynamic server page (528) capable of generating static markup documents (532) of the multimodal application that include varying proportions of support for voice mode and non-voice modes. In the Modality example set forth above, a multimodal application specifies such a dynamic server page by:

```
<form name="fid" action="http://www.webBrowser.com/modality.jsp">
``` where "www.webBrowser.com" specifies the web server that contains the dynamic server page, and "modality.jsp" specifies the name of the dynamic server page. The operation of the "submit" type input field:

```
<input type="submit" name="in3" ev:event="onClick"
    ev:handler="JavaScript:calculateModalCoefficient( )"/>
``` transmits the name of the dynamic server page to the specified web server in an HTTP message, with the form data URL encoded, including the evaluation of the user mode preference in the form of a modal coefficient.

The method of FIG. 7 includes dynamically configuring (506) multimodal content of the multimodal application, carried out somewhat differently from the method of FIG. 6. In the method of FIG. 7, dynamically configuring (506) multimodal content of the multimodal application is carried out by generating (530) by the dynamic server page (528) a static markup document (532) for presentation to a user as part of the multimodal application, the static markup document characterized by proportions of support for voice and non-voice modes established by the dynamic server page in dependence upon the value of the user modal preference.

In an example where the evaluation of user modal preference is represented by a modal coefficient having a range of values centered on 0.5 with values higher than 0.5 representing a higher preference for voice mode and values lower than 0.5 representing a preference for non-voice modes, then the dynamic server (528) may be programmed to generate a static markup document (532), that is, a static web page, with half of its data entry fields voice-enabled when presented with an evaluation of user modal preference of 0.5, one-third of its data entry fields voice-enabled when presented with an evaluation of user modal preference of 0.25, three-fourths of its data entry fields voice-enabled when the evaluation of user modal preference is 0.75, and so on.

Exemplary embodiments of the present invention are described largely in the context of a fully functional computer system for establishing a preferred mode of interaction between a user and a multimodal application. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of establishing a preferred mode of interaction between a user and a multimodal application, the method comprising:

evaluating, with at least one processor of a multimodal device comprising a multimodal application supporting multiple modes of interaction including a voice mode and one or more non-voice modes, a user modal preference, wherein evaluating the user modal preference comprises determining a modal coefficient value based, at least in part, on one or more modes of interaction used by the user in at least one previous interaction with a plurality of voice-enabled and/or non-voice enabled data entry fields presented by the multimodal application and evaluating the user modal preference based, at least in part, on the modal coefficient value; and dynamically configuring, with the at least one processor, multimodal content of the multimodal application in dependence on the user modal preference;

wherein the multimodal application comprises a plurality of static markup documents, wherein the plurality of static markup documents comprises documents having different proportions of support for voice mode and non-voice modes;

wherein dynamically configuring multimodal content of the multimodal application further comprises selecting from among the plurality of static markup documents, in dependence upon the value of the user modal preference, a markup document for presentation to a user as part of the multimodal application.

2. The method of claim 1, wherein evaluating the user modal preference further comprises:

selecting the user modal preference as one of the one or more modes of interaction used by the user in at least one previous interaction.

3. The method of claim 1 wherein evaluating user modal preference further comprises evaluating user modal preference in dependence upon a user-supplied configuration value of user modal preference.

4. The method of claim 1 wherein the multimodal application comprises a set of multimodal application markup documents organized in a sequence of presentation, and wherein dynamically configuring multimodal content of the multimodal application further comprises altering the sequence of presentation.

5. The method of claim 1, wherein the multimodal application specifies a dynamic server page capable of generating the static markup documents of the multimodal application that include varying proportions of support for voice mode and non-voice modes, and wherein dynamically configuring multimodal content of the multimodal application further comprises generating by the dynamic server page a static markup document for presentation to a user as part of the multimodal application, the static markup document characterized by proportions of support for voice and non-voice modes established by the dynamic server page in dependence upon the value of the user modal preference.

6. The method of claim 1, further comprising:
receiving a configuration value indicating the user modal preference; and
storing the configuration value;
wherein evaluating the user modal preference comprises retrieving the stored configuration value.

7. Apparatus for establishing a preferred mode of interaction between a user and a multimodal application, the apparatus comprising:
at least one computer processor; and
at least one computer memory operatively coupled to the at least one computer processor, the at least one computer memory storing computer program instructions, that when executed by the at least one computer processor perform a method comprising;
evaluating, by a multimodal application operating on a multimodal device supporting multiple modes of interaction including a voice mode and one or more non-voice modes, a user modal preference, wherein evaluating the user modal preference comprises determining a modal coefficient value based, at least in part, on one or more modes of interaction used by the user in at least one previous interaction with a plurality of voice-enabled and/or non-voice enabled data entry fields presented by the multimodal application and evaluating the user modal preference based, at least in part, on the modal coefficient value; and
dynamically configuring with the at least one computer processor, multimodal content of the multimodal application in dependence on the user modal preference;
wherein the multimodal application comprises a plurality of static markup documents, wherein the plurality of static markup documents comprises documents having different proportions of support for voice mode and non-voice modes;
wherein dynamically configuring multimodal content of the multimodal application further comprises selecting among the plurality of static markup documents, in dependence upon the value of the user modal preference, a markup document for presentation to a user as part of the multimodal application.

8. The apparatus of claim 7 wherein evaluating the user modal preference method further comprises:
selecting the user modal preference as one of the one or more modes of interaction used by the user in at least one previous interaction.

9. The apparatus of claim 7 wherein evaluating the user modal preference further comprises evaluating the user modal preference in dependence upon a user-supplied configuration value of the user modal preference.

10. The apparatus of claim 7 wherein the multimodal application comprises a set of multimodal application markup documents organized in a sequence of presentation, and wherein dynamically configuring multimodal content of the multimodal application further comprises altering the sequence of presentation.

11. The apparatus of claim 7, wherein the multimodal application specifies a dynamic server page capable of generating the static markup documents of the multimodal application that include varying proportions of support for voice mode and non-voice modes, and wherein dynamically configuring multimodal content of the multimodal application further comprises generating by the dynamic server page a static markup document for presentation to a user as part of the multimodal application, the static markup document characterized by proportions of support for voice and non-voice modes established by the dynamic server page in dependence upon the value of the user modal preference.

12. An apparatus for establishing a preferred mode of interaction between a user and a multimodal application, the apparatus comprising:
at least one computer processor; and
at least one computer memory operatively coupled to the at least one computer processor, the at least one computer memory having disposed within it computer program instructions capable of;
evaluating, by a multimodal application operating on a multimodal device supporting multiple modes of interaction including a voice mode and one or more non-voice modes, a user modal preference, wherein evaluating the user modal preference comprises determining a modal coefficient value based, at least in part, on one or more modes of interaction used by the user in at least one previous interaction with a plurality of voice-enabled and/or non-voice enabled data entry fields presented by the multimodal application and evaluating the user modal preference based, at least in part, on the modal coefficient value; and
dynamically configuring with the at least one computer processor, multimodal content of the multimodal application in dependence upon the evaluation of the user modal preference;
wherein the multimodal application specifies a dynamic server page capable of generating static markup documents of the multimodal application that include varying proportions of support for voice mode and non-voice modes;
wherein dynamically configuring multimodal content of the multimodal application further comprises generating by the dynamic server page a static markup document for presentation to a user as part of the multimodal application, the static markup document characterized by proportions of support for voice and non-voice modes established by the dynamic server page in dependence upon the value of the user modal preference.

13. The apparatus of claim 12, wherein the method further comprises:
receiving a configuration value indicating the user modal preference; and
storing the configuration value;
wherein evaluating the user modal preference comprises retrieving the stored configuration value.

14. A non-transitory computer-readable recordable medium encoded with computer program instructions that, when executed by a computer, perform a method of establishing a preferred mode of interaction between a user and a multimodal application, the method comprising:
evaluating, by the multimodal application operating on a multimodal device supporting multiple modes of interaction including a voice mode and one or more non-voice modes, a user modal preference, wherein evaluating the user modal preference comprises determining a modal coefficient value based, at least in part, on one or more modes of interaction used by the user in at least one previous interaction with a plurality of voice-enabled and/or non-voice enabled data entry fields presented by the multimodal application and evaluating the user modal preference based, at least in part, on the modal coefficient value; and dynamically configuring multimodal content of the multimodal application in dependence on the user modal preference;

wherein the multimodal application comprises a plurality of static markup documents, wherein the plurality of static markup documents comprises documents having different proportions of support for voice mode and non-voice modes;

wherein dynamically configuring multimodal content of the multimodal application further comprises selecting among the plurality of static markup documents, in dependence upon the value of the user modal preference, a markup document for presentation to a user as part of the multimodal application.

15. The computer-readable recordable medium of claim 14, wherein the method further comprises:

selecting the user modal preference as one of the one or more modes of interaction used by the user in at least one previous interaction.

16. The computer-readable recordable medium of claim 14 wherein evaluating the user modal preference further comprises evaluating the user modal preference in dependence upon a user-supplied configuration value of the user modal preference.

17. The computer-readable recordable medium of claim 14 wherein the multimodal application comprises a set of multimodal application markup documents organized in a sequence of presentation, and wherein dynamically configuring multimodal content of the multimodal application further comprises altering the sequence of presentation.

18. The computer-readable recordable medium of claim 14 wherein the multimodal application specifies a dynamic server page capable of generating the static markup documents of the multimodal application that include varying proportions of support for voice mode and non-voice modes, and wherein dynamically configuring multimodal content of the multimodal application further comprises generating by the dynamic server page a static markup document for presentation to a user as part of the multimodal application, the static markup document characterized by proportions of support for voice and non-voice modes established by the dynamic server page in dependence upon the value of the user modal preference.

19. The computer-recordable medium of claim 14, wherein the method further comprises:

receiving a configuration value indicating the user modal preference; and storing the configuration value;

wherein evaluating the user modal preference comprises retrieving the stored configuration value.

20. A non-transitory computer-readable recordable medium encoded with computer program instructions that, when executed by a computer, perform a method of establishing a preferred mode of interaction between a user and a multimodal application, the method comprising:

evaluating, by the multimodal application operating on a multimodal device supporting multiple modes of interaction including a voice mode and one or more non-voice modes, a user modal preference, wherein evaluating the user modal preference comprises determining a modal coefficient value based, at least in part, on one or more modes of interaction used by the user in at least one previous interaction with a plurality of voice-enabled and/or non-voice enabled data entry fields presented by the multimodal application and evaluating the user modal preference based, at least in part, on the modal coefficient value; and dynamically configuring multimodal content of the multimodal application in dependence upon the evaluation of the user modal preference;

wherein the multimodal application specifies a dynamic server page capable of generating static markup documents of the multimodal application that include varying proportions of support for voice mode and non-voice modes;

wherein dynamically configuring multimodal content of the multimodal application further comprises generating by the dynamic server page a static markup document for presentation to a user as part of the multimodal application, the static markup document characterized by proportions of support for voice and non-voice modes established by the dynamic server page in dependence upon the value of the user modal preference.

21. A method of establishing a preferred mode of interaction between a user and a multimodal application, the method comprising:

evaluating, with at least one processor of a multimodal device comprising a multimodal application supporting multiple modes of interaction including a voice mode and one or more non-voice modes, a user modal preference, wherein evaluating the user modal preference comprises determining a modal coefficient value based, at least in part, on one or more modes of interaction used by the user in at least one previous interaction with a plurality of voice-enabled and/or non-voice enabled data entry fields presented by the multimodal application and evaluating the user modal preference based, at least in part, on the modal coefficient value; and dynamically configuring, with the at least one processor, multimodal content of the multimodal application in dependence upon the evaluation of the user modal preference;

wherein the multimodal application specifies a dynamic server page capable of generating static markup documents of the multimodal application that include varying proportions of support for voice mode and non-voice modes;

wherein dynamically configuring multimodal content of the multimodal application further comprises generating by the dynamic server page a static markup document for presentation to a user as part of the multimodal application, the static markup document characterized by proportions of support for voice and non-voice modes established by the dynamic server page in dependence upon the value of the user modal preference.

\* \* \* \* \*